(No Model.) 2 Sheets—Sheet 1.
E. A. SANDERS.
SHEARS.
No. 481,200. Patented Aug. 23, 1892.
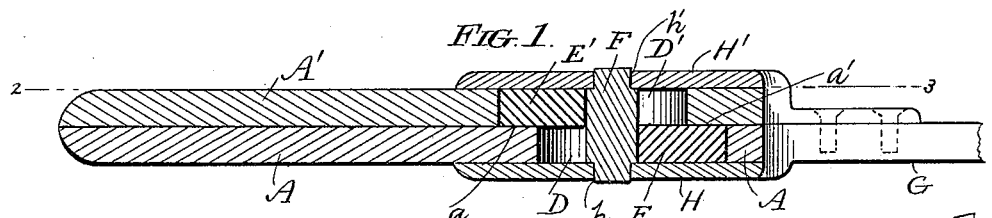
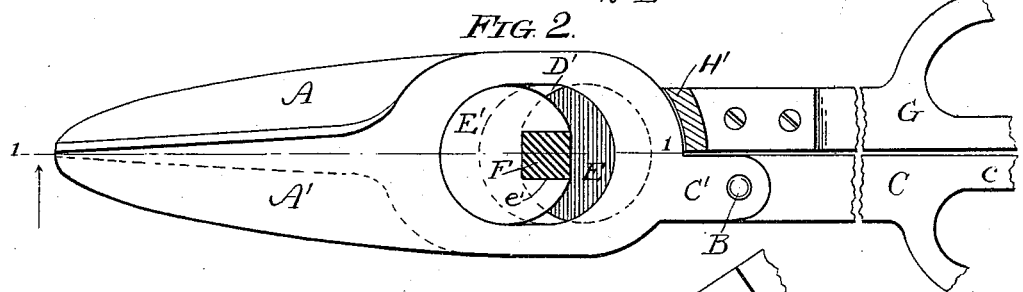
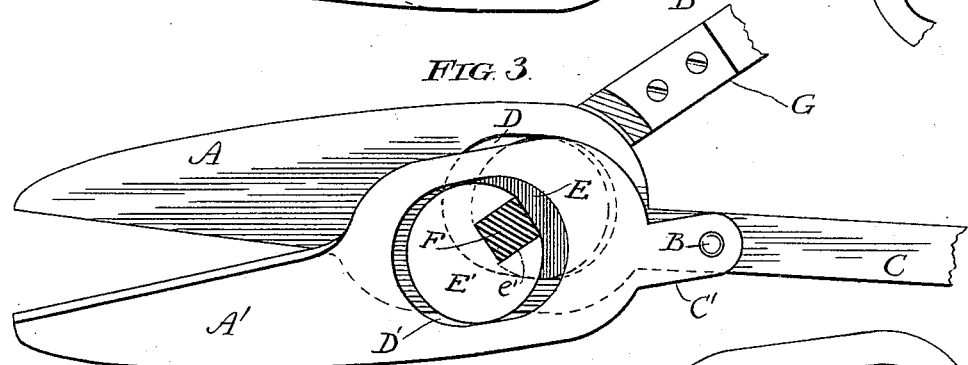
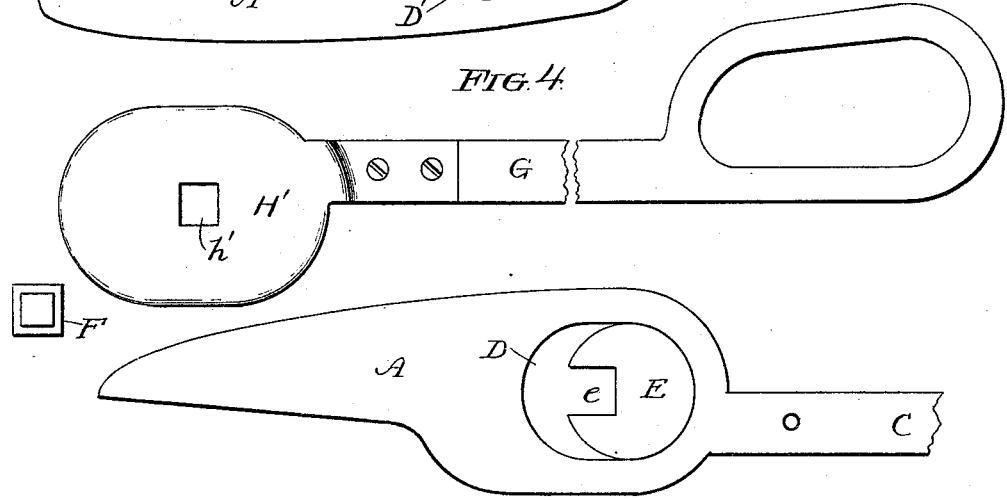
Witnesses
J. Halpenny
G. Nystrom
Inventor:
Edward A. Sanders,
By Gridley & Hopkins
His Attorneys.

(No Model.) 2 Sheets—Sheet 2.

E. A. SANDERS.
SHEARS.

No. 481,200. Patented Aug. 23, 1892.

Witnesses:
J. Halpenny
G. Nystrum

Inventor:
Edward A. Sanders
By Gridley & Hopkins
His Attorneys.

THE NORRIS PETERS CO., PHOTO-LITHO., WASHINGTON, D. C.

UNITED STATES PATENT OFFICE.

EDWARD A. SANDERS, OF CHICAGO, ILLINOIS.

SHEARS.

SPECIFICATION forming part of Letters Patent No. 481,200, dated August 23, 1892.

Application filed May 26, 1891. Serial No. 394,137. (No model.)

*To all whom it may concern:*

Be it known that I, EDWARD A. SANDERS, a citizen of the United States, residing at Chicago, in the county of Cook and State of Illinois, have invented certain new and useful Improvements in Shears, of which the following is a specification, reference being had to the accompanying drawings, which are made a part hereof, and in which—

Figure 5:
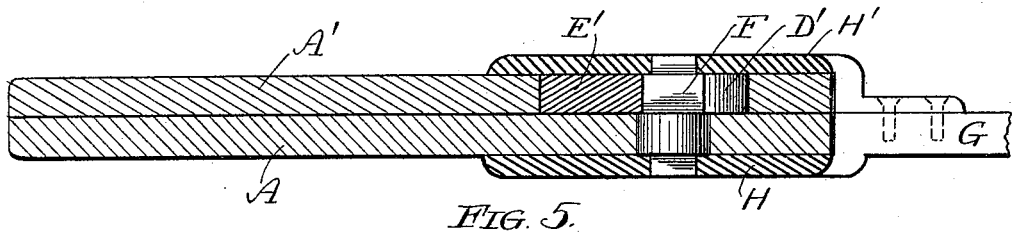
Figure 6:
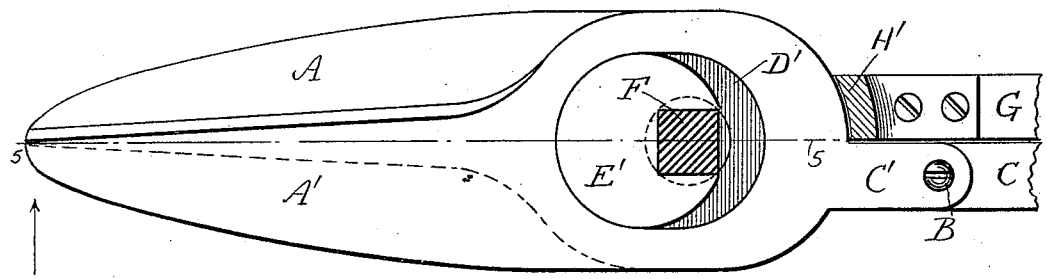
Figure 7:
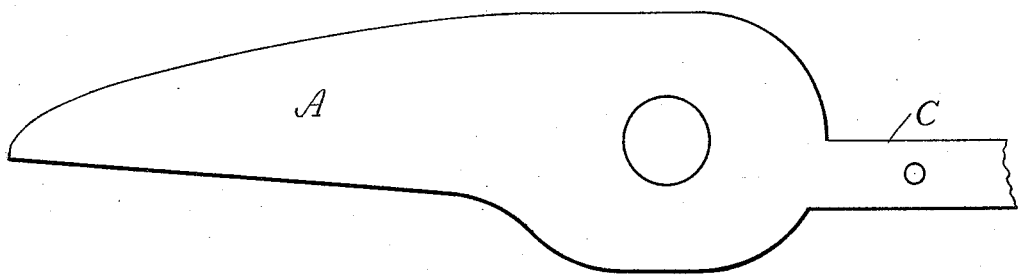
Figure 8:
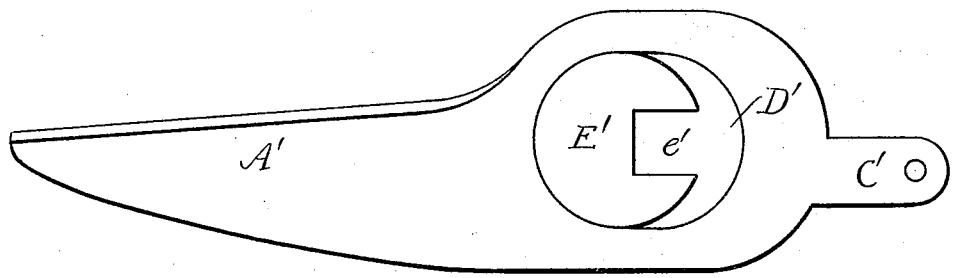

Figure 1 is a central longitudinal section of a pair of the improved shears with the blades closed, the plane of the section being indicated by the line 1 1, Fig. 2. Figs. 2 and 3 are sections thereof on the line 2 3, Fig. 1, the former showing the blades closed and the latter showing them open. Fig. 4 is a view showing the principal parts detached and in elevation. Fig. 5 is a central longitudinal section of a pair of shears embodying the invention under a slight modification, the plane of the section being indicated by the line 5 5, Fig. 6. Fig. 6 is a sectional elevation thereof on the line 6 6, Fig. 5. Figs. 7 and 8 are elevations of the two blades thereof.

The object of the present invention is to interpose between the handles and blades of a pair of shears such mechanism as will cause the blades to exert a power greater than the power that is exerted upon the handles; and to this end said invention consists in certain features of novelty that are particularly pointed out in the claims hereinafter.

In the drawings, A and A' represent the two blades, and B the pivot by which they are secured together, so as to be capable of the customary relative movement. The blade A is provided with an operating-handle C, having bow $c$; but the blade A' has no such handle, though it is provided at the place where the handle would naturally join it with a short arm C', near the end of which the pivot B is situated, the object being to provide a sufficient leverage, as will appear presently.

In the blade A is an opening D, which is oblong with semicircular ends, preferably, and in the blade A' is a similar opening D'. In the opening D is situated a disk E, which is circular, save for a rectangular notch $e$ cut in its periphery, and in the opening D' is a similar disk E' $e'$. The disks are so situated that the notches $e$ and $e'$ register and form a square eye, through which is passed a square stud F. When in place, the disks are eccentric with respect to the stud and their summits are diametrically opposite each other. When the blades are closed, as shown in Figs. 1 and 2, the longest radii of these eccentrics are parallel with the sides of the openings D D', and each eccentric bears at its summit against the end of the opening in which it is situated.

It will be readily understood that by turning the stud F in one direction the blades A and A' will be separated or opened, as shown by Fig. 3, and by turning it in the other direction they will be closed, as shown by Figs. 1 and 2. To accomplish this turning of the stud, I employ a handle G, having a plate H, that rests upon the blade A, completely covering the opening D, and a second plate H', which rests upon the blade A', completely covering the opening D'. The plate H is integral with the handle G, an offset being formed at their junction in order that said handle may lie in the plane of the handle C; but the plate H' is separate and secured to handle G by screws. These plates have non-circular eyes $h$ and $h'$, respectively, which receive the correspondingly-shaped extremities of the stud F, said extremities being slightly reduced in order to prevent endwise displacement of the stud.

It will be seen that when the parts are secured together the eccentrics E and E' and stud F are practically one member—that is, there is no relative movement between them—and I desire to have it understood that my invention would not be departed from by forming these parts integral.

The openings D and D' are preferably of the same length, but so arranged with respect to each other that each is overlapped at one end by a portion of the blade in which the other is formed, thereby forming shoulders $a$ and $a'$, respectively, upon which the eccentrics rest and by which they are held in their proper planes when the openings are parallel.

With the arrangement shown in the drawings each of the eccentrics bears against both of the blades—i. e., directly against the blade in which it is situated and indirectly against the other blade—through the medium of the stud F and the other eccentric. If but one of the blades were provided with an eccentric and the stud F were simply pivoted to the other blade, as shown by Figs. 5, 6, 7, and 8, some of the advantages of my invention would follow; but the relative movement of the blades produced by a given movement of the handles would be only half as much as where two eccentrics are used, as shown. The blades may be connected otherwise than by a pivot, if desired.

What I claim as new is—

1. In a pair of shears, the combination of a pair of shear-blades A and A', means connecting the blades and holding them against endwise displacement, mechanism having connection with the blades for opening and closing them, said mechanism including an eccentric adapted to bear in opposite directions against one of said blades for moving it in opposite directions, and means through which it bears indirectly against the other blade, and a pair of handles suitably connected with the other parts, substantially as set forth.

2. In a pair of shears, the combination, with the shear-blade A, having the handle C rigid therewith, of the shear-blade A', means connecting said blades and holding them against relative endwise movement, the handle C', movable independently of both blades, and mechanism having connection with said blades for opening and closing them, said mechanism including an eccentric adapted to bear in opposite directions against one of said blades for moving it in either direction, and means through which it bears indirectly against the other blade, substantially as set forth.

3. The combination, with a pair of relatively-movable blades and means connecting them, of a pair of eccentrics each having a bearing against one of said blades and means for operating said eccentrics, substantially as set forth.

4. The combination, with a pair of blades and means connecting them, of a pair of handles, a pair of eccentrics each bearing against one of said blades, and means connecting said eccentrics with one of said handles, substantially as set forth.

5. The combination, with the relatively-movable blades A A', having openings D D', and means connecting said blades, of the eccentrics E E', occupying said openings, respectively, the stud F, connecting said eccentrics, and the handle G, having suitable connection with said stud, substantially as set forth.

6. The combination, with the blades A A', having openings D D', and means connecting said blades, of the eccentrics E E', occupying said openings, respectively, the stud F, connecting said eccentrics, the plates H H', engaging said stud, and the handle G, to which said plates are connected, substantially as set forth.

7. The combination of the blades A A', having openings D D', arranged with respect to each other, so that each of said openings is partly overlapped by the blade in which the other is formed, producing shoulders $a$ and $a'$, means connecting said blades, the eccentrics E E', situated in said openings, respectively, and means for operating said eccentrics, substantially as set forth.

EDWARD A. SANDERS.

Witnesses:
J. HALPENNY,
L. M. HOPKINS.